United States Patent Office 2,734,798
Patented Feb. 14, 1956

2,734,798

MANUFACTURE OF HYDROGEN PEROXIDE

Jonas Kamlet, Easton, Conn., assignor to The Goodyear Tire & Rubber Company, a corporation of Ohio No Drawing. Application August 12, 1953, Serial No. 373,914

10 Claims. (Cl. 23—207)

This invention relates to a process for the manufacture of hydrogen peroxide. More particularly, it relates to improvements in the process for the manufacture of hydrogen peroxide by the cyclic oxidation and reduction of an autoxidizable intermediate in a solvent in which hydrogen peroxide is of limited solubility. It has for its purpose to provide an economical process for the manufacture of hydrogen peroxide in high concentrations from cheap and readily available raw materials, without the necessity of using complicated and expensive electrolytic cells, pressure reactors and catalytic hydrogenation vessels. It has for its further purpose to provide a process for the manufacture of hydrogen peroxide by the cyclic oxidation and reduction of an autoxidizable intermediate in an organic solvent which is substantially devoid of fire and explosive hazards.

Numerous processes have been described in the prior art for the manufacture of hydrogen peroxide and related peroxidic compounds, based on the cyclic oxidation and reduction of an autoxidizable intermediate (such as hydrazobenzene, 4,4'-hydrazotoluene, 4-ethylhydrazobenzene, anthrahydroquinone, 2-ethylanthrahydroquinone, leuco-indigotin, dihydrophenanthraquinone) in a solvent in which hydrogen peroxide is of limited solubility (such as benzene, toluene, xylene, anisole-isoheptyl alcohol couples, benzene-methanol and benzene-ethanol couples, diphenylmethane, ditolylmethane, diphenylpropane, benzene-methylcyclohexanol couples, dibutyl sebacate and other esters of sebacic acid, disubstituted organic esters of phosphoric acids, trisubstituted organic esters of phosphoric acid, etc.). In all of these processes, the oxidation step is readily and simply effected by the use of oxygen or an oxygen-containing gas, such as air.

The reduction step is more often the most difficult and expensive feature of the process. The reduction of the azo compound to the hydrazo compound has heretofore been effected as follows:

(a) By the use of sodium amalgam (U. S. Patents 2,035,101 (1936), 2,083,691 (1937), 2,144,341 (1939), 2,158,523 (1939), 2,178,640 (1939) and 2,639,977 (1953); British Patents 449,360 (1936), 468,697 (1937), and German Patent 649,234 (1937). This requires the use of an elaborate and expensive plant installation of electrolytic cells, the use of large quantities of mercury in the circulating amalgam and a considerable investment in equipment.

(b) By catalytic hydrogenation in the presence of a suitable catalyst (German Patents 671,318 (1941) and 801,840 (1951); British Patents 465,070 (1937) and 508,081 (1939); U. S. Patents 2,059,569 (1936), 2,369,912 (1945), 2,455,238 (1948), 2,537,516 (1951) and 2,537,655 (1951); PB Report No. 395, Item No. 22, File XIX-4; PB Report No. 4336).

This process has been operated on a commercial scale in Germany and the United States. It has a number of practical disadvantages which the process of this invention is intended to overcome. These disadvantages are:

(a) It is usually quite difficult to remove the last traces of hydrogen peroxide which may be emulsified through the larger volume of solution of azo compound in organic solvent. This hydrogen peroxide poisons the catalyst used for the hydrogenation and must be removed in a separate precontactor vessel. Often the catalyst has adsorbed sufficient hydrogen from preceding hydrogenations to react violently with hydrogen peroxide carried over accidentally. Fires and explosions have resulted from such reactions with considerable losses attendant and some danger to personnel.

(b) Specially activated catalysts are usually required to avoid ring hydrogenation when the azo compound is reduced to the hydrazo stage (German Patent 801,840).

(c) The catalyst has a comparatively short life (PB Report 4336, page 8) and is easily poisoned by sulfur, phosphorus, arsenic and similar catalyst poisons. Any benzene used must be free of thiophene. Relatively expensive hydrogenation vessels, catalyst filters and regeneration equipment are required.

It is the further purpose of this invention to provide a simple means for the reduction of the azo compound to the hydrazo stage in which:

(a) the reducing agent will represent little or no actual cost to the process inasmuch as it will be recoverable in a form which can be converted to by-products of greater intrinsic value than the original reducing agent proper, (b) any hydrogen peroxide carried over accidentally with the solution of azo compound in organic solvent will simply be reduced to water by the reducing agent, with no fire or explosive hazard whatever, and with complete ease and safety, (c) no special equipment, special catalysts, filters, regenerators or precautionary devices will be required.

The basis of the present invention is the finding that the solution of the aromatic azo compound in an organic solvent may be reduced to the hydrazo stage by agitation with a member of the group consisting of sodium hydrosulfide (NaHS) or calcium hydrosulfide (Ca(HS)$_2$) in an aqueous medium, at a temperature between 0° C. and 70° C., and preferably between 20° C. and 40° C., according to the equations:

$$R-N=N-R'+2NaHS \rightarrow R-NH-NH-R'+Na_2S_2$$
$$R-N=N-R'+Ca(HS)_2 \rightarrow R-NH-NH-R'+CaS_2$$

(where R and R' are chosen from the group consisting of aryl and substituted aryl groups).

The organic solvent containing the azo compound is emulsified and stirred with the aqueous medium containing the required amount of NaHS or Ca(HS)$_2$ until the reduction to the hydrazo stage is substantially completed. The agitation is then discontinued and the phases are permitted to stratify and separate. The organic phase, i. e. the hydrazo compound in the organic solvent, is separated from the aqueous phase containing sodium disulfide or calcium disulfide.

The organic phase containing the hydrazo compound is then treated with an oxygen containing gas at atmospheric or superatmospheric pressures at temperatures between 0° C. and 70° C., and preferably between 20° C. and 40° C. until the theoretical amount of oxygen has been absorbed and converted to hydrogen peroxide. The hydrogen peroxide emulsified throughout the organic solvent is then permitted to settle and stratify and may be separated from the organic layer in concentrations as high as 95% H$_2$O$_2$. However, it is usually advisable to effect the oxidation before, during or after the addition of a small amount of water to the organic solvent. This water combines with the hydrogen peroxide and the latter is then much more easily separated in concentrations of 25% to 70% H$_2$O$_2$.

As an oxidizing agent, oxygen or an oxygen-containing gas (such as air) may be used. In spite of its higher cost, the use of oxygen is usually preferred. It is more rapidly reactive than air, permitted more efficient utilization of equipment. When air is used as an oxidizing agent, the inert components must be vented and passed through an absorptive system to recover entrained vapors of the organic solvent. When oxygen is used, it may simply be conducted into the oxidation vessel, at a slight positive pressure, until the required amount has been absorbed and converted to hydrogen peroxide.

The reducing agent may be prepared very simply by the following reactions:

(a) By passing $H_2S$ gas into an aqueous solution of sodium hydroxide or sodium sulfide, at a temperature below 40° C.:

$$NaOH + H_2S \rightarrow NaHS + H_2O$$
$$Na_2S + H_2S \rightarrow 2NaHS$$

(b) By passing $H_2S$ into an aqueous solution suspension of milk of lime and salt cake (or soda ash), at a temperature below 40° C., and filtering off the precipitate of calcium sulfate (or calcium carbonate):

$$Ca(OH)_2 + 2H_2S + Na_2SO_4 \rightarrow CaSO_4 + 2NaHS + 2H_2O$$
$$Ca(OH)_2 + 2H_2S + Na_2CO_3 \rightarrow CaCO_3 + 2NaHS + 2H_2O$$

(c) By passing $H_2S$ into an aqueous slurry of lime:

$$Ca(OH)_2 + 2H_2S \rightarrow Ca(HS)_2 + 2H_2O$$

The reducing agent may be prepared in a separate reaction vessel prior to addition to the organic solvent containing the azo compound. Alternatively, it may be prepared in situ in the reduction vessel. Thus, a solution of the azo compound in the organic solvent may be emulsified with an aqueous solution of sodium hydroxide or sodium sulfide or an aqueous slurry of lime, and hydrogen sulfide gas passed into the well agitated reaction mixture, at a temperature between 0° C. and 70° C. and preferably between 20° C. and 40 C. Sodium hydrosulfide or calcium hydrosulfide is formed in situ and the reduction to the hydrazo stage is effected as above. On separating the organic and aqueous phases the solution of the hydrazo compound in the organic phase is returned to the oxidation step of the process. The aqueous phase containing $Na_2S_2$ or $CaS_2$ is processed for by-product recovery.

The sodium disulfide solution obtained as a by-product of this process is valuable inasmuch as it may be converted by a simple air oxidation to sodium thiosulfate ("hypo"), which is used in large quantities as an antichlor in laundries and in bleaching of paper pulp, as a photographic fixing agent, for the extraction of silver from its ores and the recovery of silver from scrap film, as a reducing agent, mordant and many other uses:

$$2Na_2S_2 + 3O_2 + 10H_2O \rightarrow 2Na_2S_2O_3 \cdot 5H_2O$$

(Lunge, Handbuch der Sodaindustrie, volume 2, Brunswick (1909); Ullmann's Enzyklopadie der technischen Chemie, 2nd edition, vol. VIII, pp. 98–99; English Patents 3,072 of 1882 and 174,653; German Patents 194,881; 305,194; 307,131; 410,362; 412,656 and 423,755; U. S. Patent 1,639,905).

The calcium disulfide obtained as a by-product of this process is valuable inasmuch as it may be dissolved with additional sulfur to make the calcium polysulfide solution (or dried or sprayed powder) which is used in huge quantities throughout the world as an agricultural fungicide, acaricide, insecticide and, most recently, as a soil fumigant and conditioning agent, commonly under the name of "Lime-Sulfur Spray." (Frear, Chemistry of Insecticides and Fungicides, pp. 101–110; Chemical Industries 42, 636–639 (1938); Colorado Agr. Expt. Sta. Bulletin 352 (1929); Journ. Amer. Chem. Soc. 46, 574–581 (1924); Phytopathology 29, 993–995 (1939); Delaware Agr. Expt. Sta. Bulletin 105 (1914).) This lime-sulfur spray is usually sold as a solution of standard density 1.283 (32° Baumé), containing about 2.75 lbs. of total sulfur (as $CaS_5$, $CaS_2O_3$ and $CaSO_4$) per gallon. It is also sold as a dried or sprayed powder or as dry lime sulfur mix (U. S. Patent 1,254,908, reissued 14,870; U. S. Dept. Agr. Bull. 1371 (1926)).

If hydrogen sulfide gas is not readily available at the plant site, it may be prepared quite easily by the method described by Bacon and Boe (Industrial and Engineering Chemistry 37, 469–474 (1945)). A retort is charged with a mixture of equal parts of sulfur and a heavy fuel oil boiling above 250° C. The mixture is heated. A uniform evolution of $H_2S$ gas commences at 250° C. and continues to yield a total of about 0.80 part by weight of $H_2S$ and a pitch residue (1.20 parts) which has the fuel value of petroleum coke and may be burned as fuel under the plant boilers.

The following examples are given to define and to illustrate this invention but in no ways to limit it to reagents, proportions or conditions described therein. Obvious modifications will occur to any person skilled in the art.

*Example 1*

A solution of 184 kgs. of hydrazobenzene in 3.7 cubic meters of benzene, in a closed vessel, is agitated with 56.9 kgs. of water while oxygen is conducted into the reaction mixture at a temperature of 35°–40° C. for several hours, until a total of 32.0 kgs. of oxygen has been absorbed and the hydrazobenzene is completely oxidized to azobenzene. The agitation is discontinued, and the hydrogen peroxide solution is permitted to stratify and separate out, preferably in a vessel with a conical bottom. The hydrogen peroxide solution is separated by decantation. There is thus obtained 87.5 kgs. of a solution assaying 35% $H_2O_2$; equivalent to a yield of 90% of theory. On continuous recycling of the reaction mixture, the yields of hydrogen peroxide are consistently between 90% and 92% of theory.

A reducing solution is made by passing hydrogen sulfide into 800 liters of 10% NaOH solution, at a temperature maintained under 30° C., until a total of 68 kgs. of $H_2S$ has been absorbed. The reducing solution is added to the solution of 182 kgs. of azobenzene in 3.7 cubic meters of benzene obtained above, and the mixture is agitated vigorously at 20° C. to 40° C. until the red solution of azobenzene in benzene is decolorized and reduced to hydrazobenzene, during which the aqueous solution of NaHS will be oxidized to a red solution of $Na_2S_2$. When the reaction is complete, the agitation is discontinued and the phases are separated. The organic phase—184 kgs. of hydrazobenzene in 3.7 cubic meters of benzene—is returned to the first step of the process.

The aqueous phase comprises a solution of 110 kgs. $Na_2S_2$ in about 725 kgs. of water. This solution is heated to boiling and a rapid current of air is passed through the solution until the red color has completely disappeared and a colorless solution is obtained. The solution is concentrated to a density of 50°–52° Bé. (sp. gr. 1.53 to 1.56), and is then allowed to cool and crystallize. The copious precipitate of sodium thiosulfate crystals is centrifuged until dry to the touch. The mother liquors of the centrifuging are returned to the next batch of sodium disulfide solution to be processed. The yield of sodium thiosulfate crystals per cycle is 235 kgs.

A raw materials balance of this process, exclusive of air and water, is as follows:

32.0 lbs. of oxygen
80.0 lbs. of caustic soda
68.0 lbs. of hydrogen sulfide
0.08 lb. of hydrazobenzene (make-up for losses per cycle)
1.8 lbs. of benzene (make-up for losses per cycle)

will yield 87.5 lbs. of 35% hydrogen peroxide
235.0 lbs. of sodium thiosulfate ($Na_2S_2O_3 \cdot 5H_2O$)

Example II

A solution of 212 kgs. of 4,4'-hydrazotoluene in 4.25 cubic meters of toluene, in a closed vessel, is agitated with 57.2 kgs. of water, while oxygen is conducted into the reaction mixture at a temperature of 35°–40° C. for several hours, until a total of 32.0 kgs. of oxygen has been absorbed and the hydrazotoluene is completely oxidized to azotoluene. The agitation is discontinued, and the hydrogen peroxide solution is permitted to stratify, and separate out, preferably in a vessel with a conical bottom. The hydrogen peroxide solution is separated by decantation. There is thus obtained 88.0 kgs. of a solution assaying 35% $H_2O_2$, equivalent to a yield of 91% of theory. On continuous recycling of the reaction mixture, the yields of hydrogen peroxide are consistently between 88% and 91% of theory.

The solution of 210 kgs. of 4,4'-azotoluene in 4.25 cubic meters of toluene obtained above, is added to a slurry made by slaking 60 kgs. of lime in 600 liters of water. The mixture is agitated vigorously at 20°–40° C. while hydrogen sulfide gas is passed into the reaction mixture until 68 kgs. $H_2S$ has been absorbed. The agitation is continued until the red solution of azotoluene in toluene is decolorized and reduced to hydrazotoluene and the aqueous phase is oxidized to a red solution of calcium disulfide. When the reaction is complete, the agitation is discontinued and the phases are separated. The organic phase—186 kgs. of hydrazotoluene in 4.25 cubic meters of toluene—is returned to the first step of the process.

The aqueous phase comprises a solution of 104 kgs. of $CaS_2$ in 600 liters of water. To this solution is added 96 kgs. of sulfur and the mixture is boiled in an open vessel, exposed to the air, until the sulfur has dissolved completely, and the solution has been concentrated to the standard density of lime-sulfur solutions—32° Baumé (sp. gr. 1.283). The yield of lime-sulfur solution (containing 1250 grams per gallon of combined sulfur, chiefly as $CaS_5$) is 128 gallons.

A raw materials balance of this process, exclusive of water, is as follows:

32.0 lbs. of oxygen
60.0 lbs. of lime
68.0 lbs. of hydrogen sulfide
96.0 lbs. of sulfur
0.10 lb. of 4,4'-hydrazotoluene (make-up for losses per cycle)
2.0 lbs. of toluene (make-up for losses per cycle)

will yield 88.0 lbs. of 35% hydrogen peroxide
58.0 gallons of techn. 32° Bé. lime-sulfur solution Having described my invention, what I claim and desire to protect by Letters Patent is:

1. In the process for the manufacture of hydrogen peroxide by the oxidation of an organic hydrazo compound dissolved in an organic solvent in which the hydrazo compound and the resulting azo compound are soluble but in which the hydrogen peroxide formed is substantially insoluble, the oxidation being effected with an oxygen-containing gas, the improvement which consists of effecting the reduction of the azo compound to the corresponding hydrazo compound with a member of the group consisting of sodium hydrosulfide and calcium hydrosulfide in an aqueous medium.

2. The process of claim 1 in which the reduction is effected at a temperature between 0° C. and 70° C.

3. The process of claim 1 in which the reduction is effected at a temperature between 20° C. and 40° C.

4. The process of claim 1 in which the reduction is effected by emulsifying a mixture of an organic azo compound in a water-immiscible organic solvent with an aqueous medium containing a member of the group consisting of sodium hydrosulfide and calcium hydrosulfide, until the azo compound is reduced substantially completely to the corresponding hydrazo compound, and thereafter separating the organic solvent containing the hydrazo compound from the aqueous medium containing the oxidation products of the original reducing agent.

5. The process of claim 1 in which the reduction is effected by emulsifying a mixture of an organic azo compound in a water-immiscible organic solvent with an aqueous medium containing a member of the group consisting of sodium hydroxide, sodium sulfide and calcium hydroxide, reacting the resultant emulsion with hydrogen sulfide until the azo compound is reduced substantially completely to the corresponding hydrazo compound, and thereafter separating the organic solvent containing the hydrazo compound from the aqueous medium containing the oxidation products of the reducing agent formed in situ.

6. The process of claim 5 in which the reduction is effected at a temperature between 0° C. and 70° C.

7. The process of claim 5 in which the reduction is effected at a temperature between 20° C. and 40° C.

8. In a process for the manufacture of hydrogen peroxide by the oxidation of an organic hydrazo compound dissolved in an organic solvent in which the hydrazo compound and the resulting azo compound are soluble but in which the hydrogen peroxide formed is substantially insoluble, the oxidation being effected with an oxygen-containing gas, the improvement which consists of effecting the reduction of the azo compound to the corresponding hydrazo compound with sodium hydrosulfide in an aqueous medium, separating the sodium disulfide co-product of said reduction and oxidizing the sodium disulfide to sodium thiosulfate.

9. The process of claim 8 in which the sodium disulfide is oxidized with air to sodium thiosulfate.

10. In a process for the manufacture of hydrogen peroxide by the oxidation of an organic hydrazo compound dissolved in an organic solvent in which the hydrazo compound and the resulting azo compound are soluble but in which the hydrogen peroxide formed is substantially insoluble, the oxidation being effected with an oxygen-containing gas, the improvement which consists of effecting the reduction of azo compound to the corresponding hydrazo compound with calcium hydrosulfide in an aqueous medium, separating the calcium disulfide co-product of said reduction and reacting the acid calcium disulfide with additional sulfur to obtain a calcium polysulfide-containing solution corresponding to commercial lime-sulfur fungicide preparations.

References Cited in the file of this patent

UNITED STATES PATENTS

| | | |
|---|---|---|
| 2,059,569 | Filson et al. | Nov. 3, 1936 |
| 2,346,550 | Border et al. | Apr. 11, 1944 |
| 2,446,856 | Smith | Aug. 10, 1948 |

FOREIGN PATENTS

| | | |
|---|---|---|
| 465,070 | Great Britain | Apr. 30, 1937 |